United States Patent [19]

McColl

[11] 4,267,873
[45] May 19, 1981

[54] COMPOSITE HIGH MOBILITY TIRE FOR OFF-ROAD VEHICLES

[75] Inventor: Bruce J. McColl, Whitby, Canada

[73] Assignee: B. J. McColl & Company, Ltd., Whitby, Canada

[21] Appl. No.: 48,922

[22] Filed: Jun. 15, 1979

[51] Int. Cl.³ .................... B60C 5/06; B60C 9/18
[52] U.S. Cl. .................... 152/339; 152/209 WT; 152/354 R; 152/361 R; 152/375
[58] Field of Search .............. 152/168, 169, 195, 196, 152/200, 202, 209 B, 209 WT, 330 R, 331, 339–344, 352–354, 357, 358, 361, 363, 366, 375, 387–391, 393–399

[56] References Cited

U.S. PATENT DOCUMENTS

| 708,954 | 9/1902 | Blodgett | 152/358 |
|---|---|---|---|
| 802,389 | 10/1905 | Gregg et al. | 152/387 |
| 2,217,122 | 10/1940 | Lowry | 152/339 |
| 2,479,714 | 8/1949 | Bell | 152/352 |
| 2,735,471 | 2/1956 | McLean | 152/340 |
| 3,047,041 | 7/1962 | Bottasso et al. | 152/363 |
| 3,218,209 | 11/1965 | Travers et al. | 152/361 |
| 3,223,566 | 12/1965 | Niclas et al. | 156/123 |
| 3,379,236 | 4/1968 | Alderfer | 152/344 |
| 3,450,182 | 6/1969 | Verdier | 152/352 |
| 3,481,385 | 12/1969 | Depmeyer et al. | 152/360 |
| 3,481,386 | 12/1969 | Menell et al. | 152/354 |
| 3,849,220 | 11/1974 | Suzuki et al. | 156/110 R |
| 3,850,219 | 11/1974 | Snyder | 152/361 DM |
| 3,888,291 | 6/1975 | Herzlich et al. | 152/330 R |
| 3,975,490 | 8/1976 | Lapeyre | 264/250 |
| 3,983,918 | 10/1976 | French | 152/353 R |
| 4,050,495 | 9/1977 | Olsen | 152/187 |
| 4,153,265 | 5/1979 | McColl | 280/112 A |
| 4,168,732 | 9/1979 | Monzini | 152/353R |

FOREIGN PATENT DOCUMENTS 265804 11/1926 Canada .
354190 11/1935 Canada .

Primary Examiner—John E. Kittle
Attorney, Agent, or Firm—Beveridge, DeGrandi, Kline & Lunsford

[57] ABSTRACT

A low pressure, pneumatic tire is provided with a flexible tread belt that extends outwardly beyond the sidewalls respectively adjacent thereto when the sidewalls are flexed under normal load. The configuration and stiffness of the belt is such that the load carried by the tire is effectively spread beyond the width of the flexed torus. At the same time, local deformation of the belt can take place in such a way to fold up over the flexed sidewalls to prevent them from damage by shock or abrasion caused by objects striking the sidewalls.

12 Claims, 16 Drawing Figures

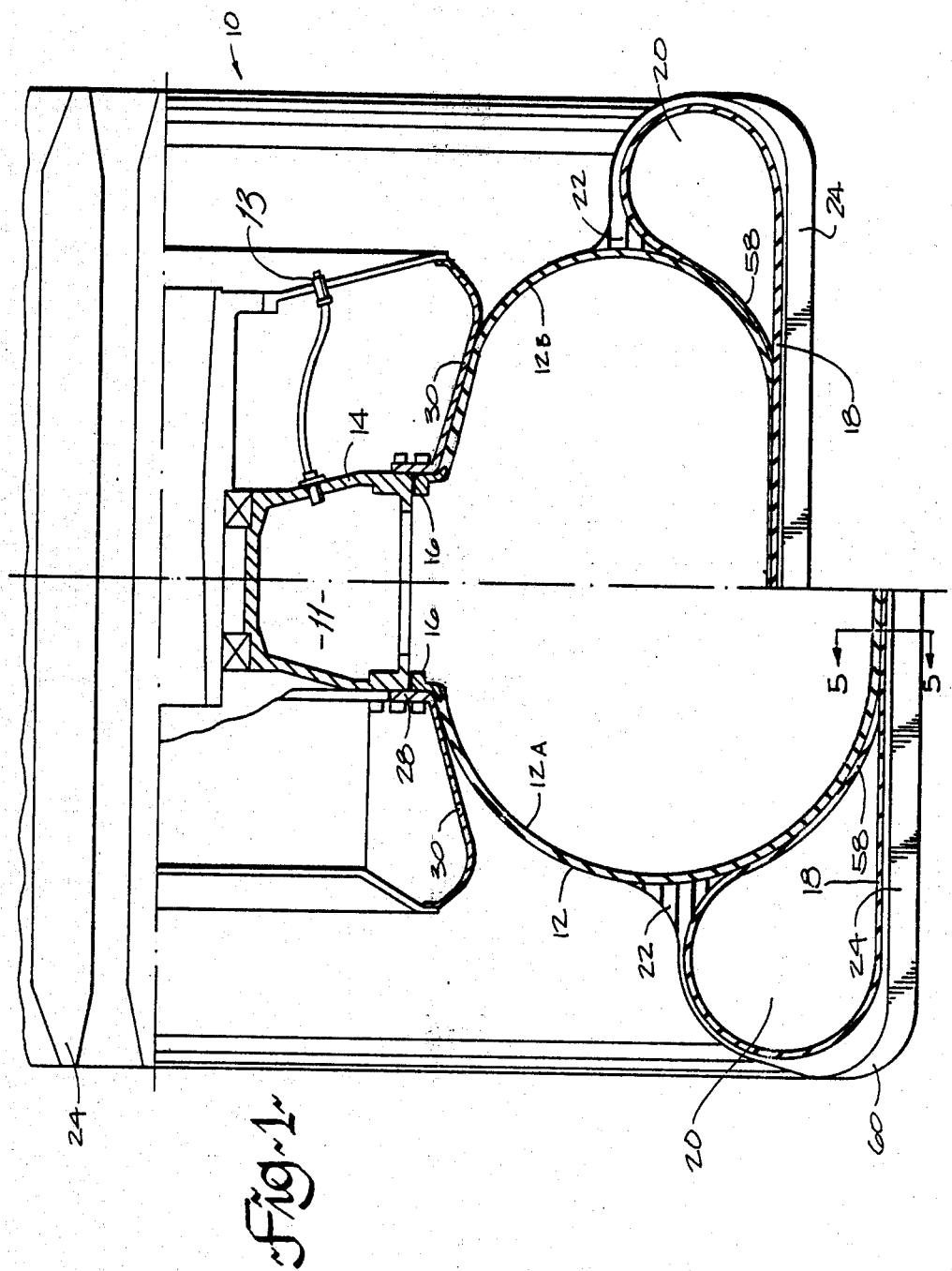

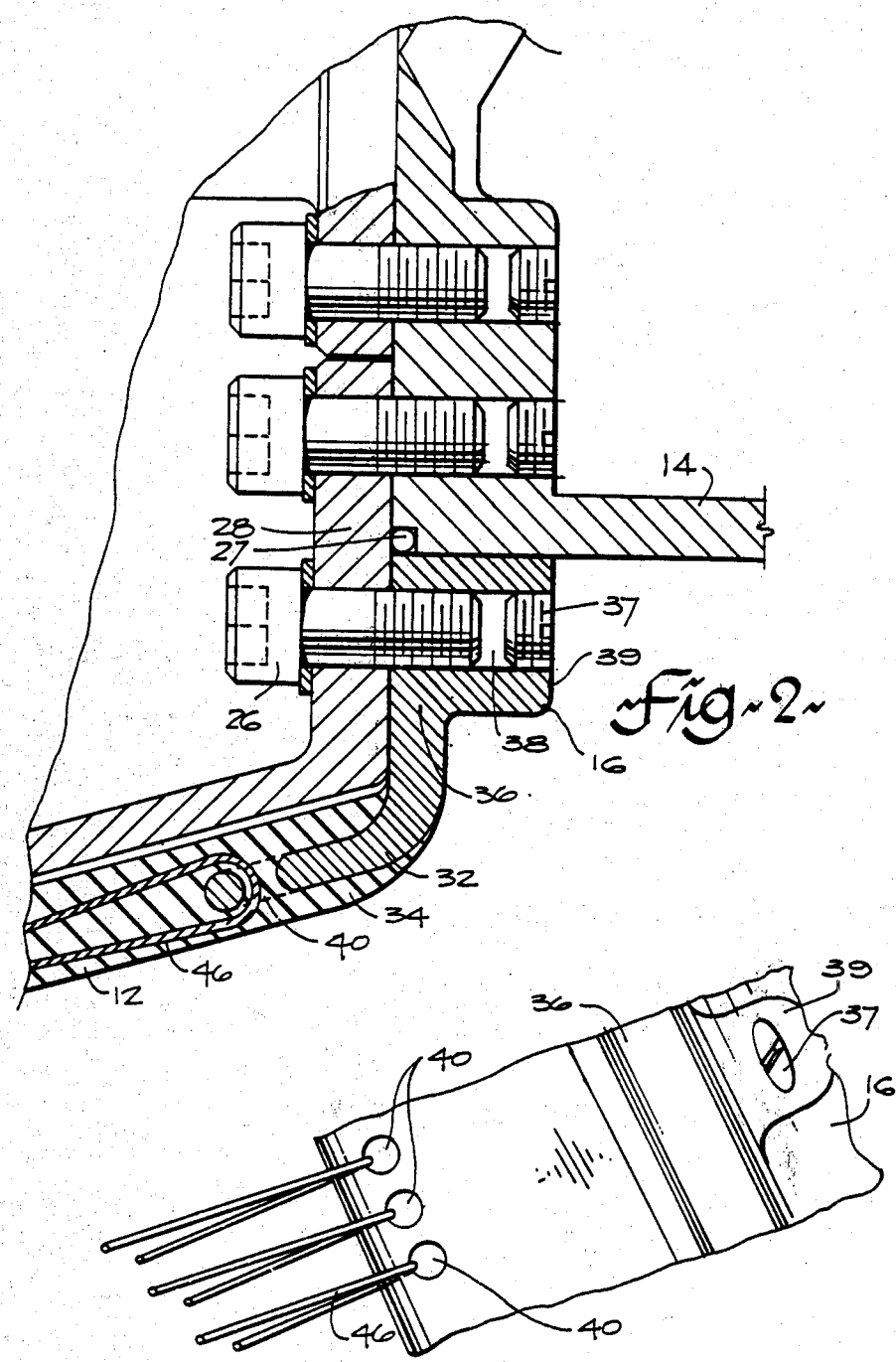

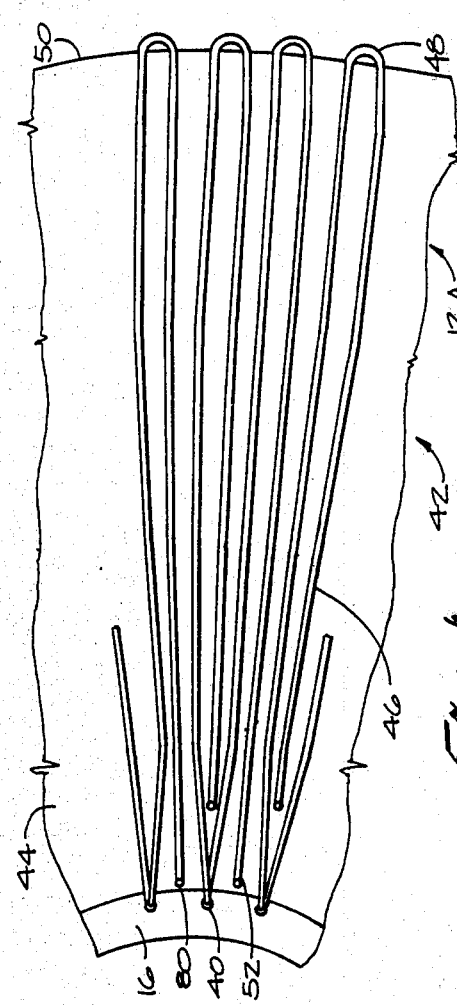
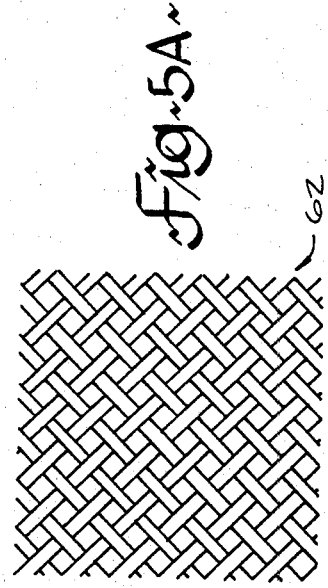
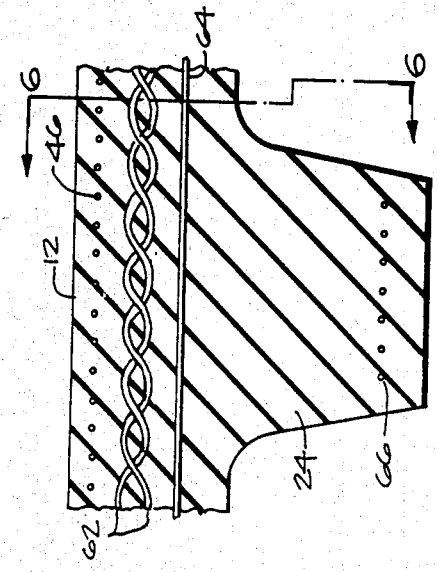
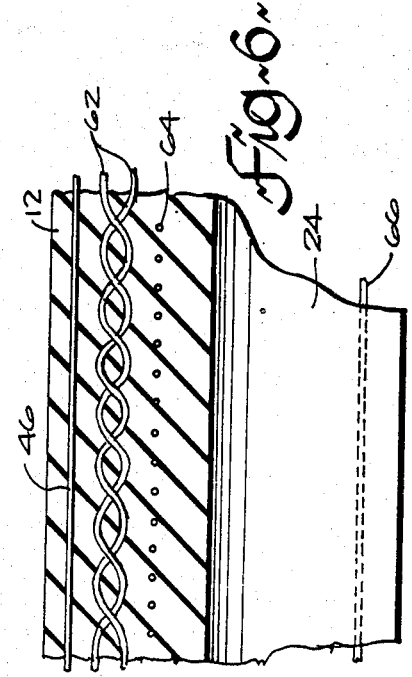

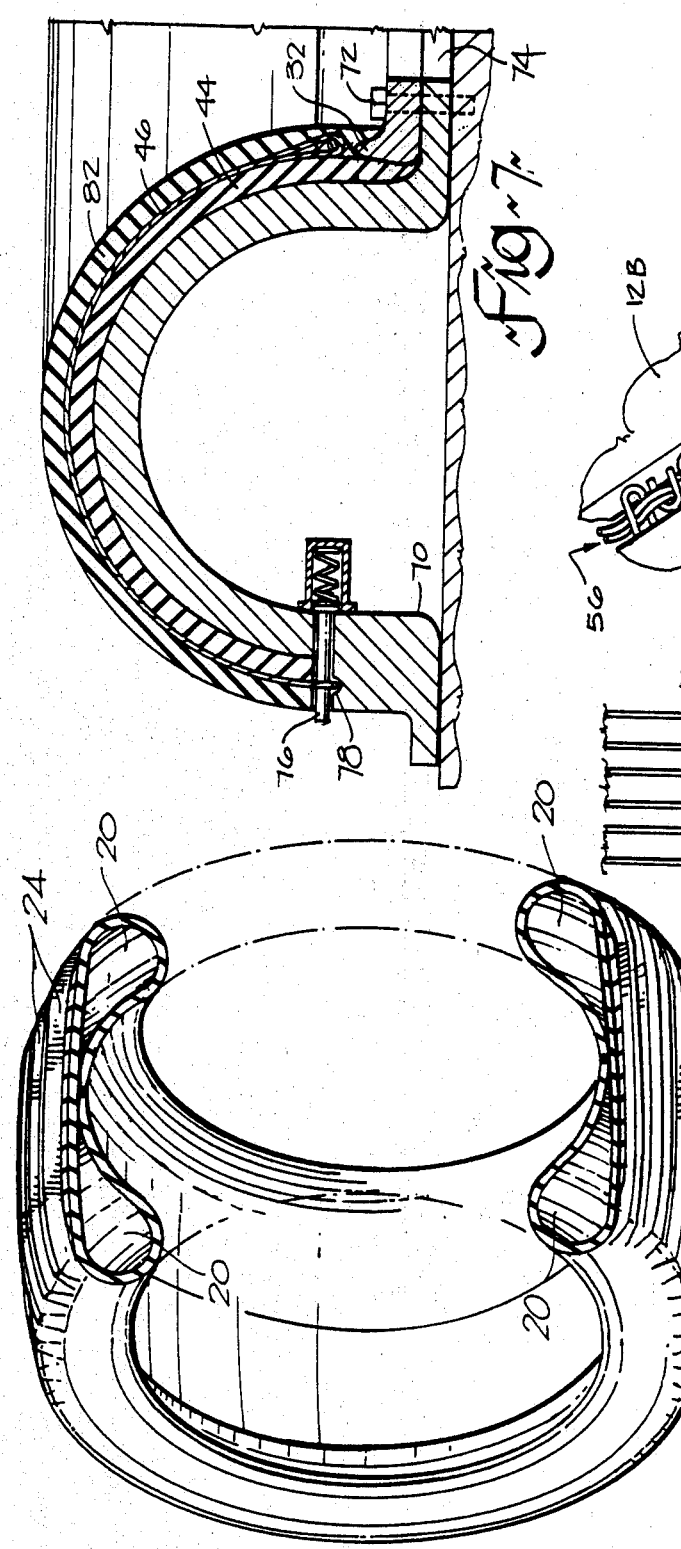

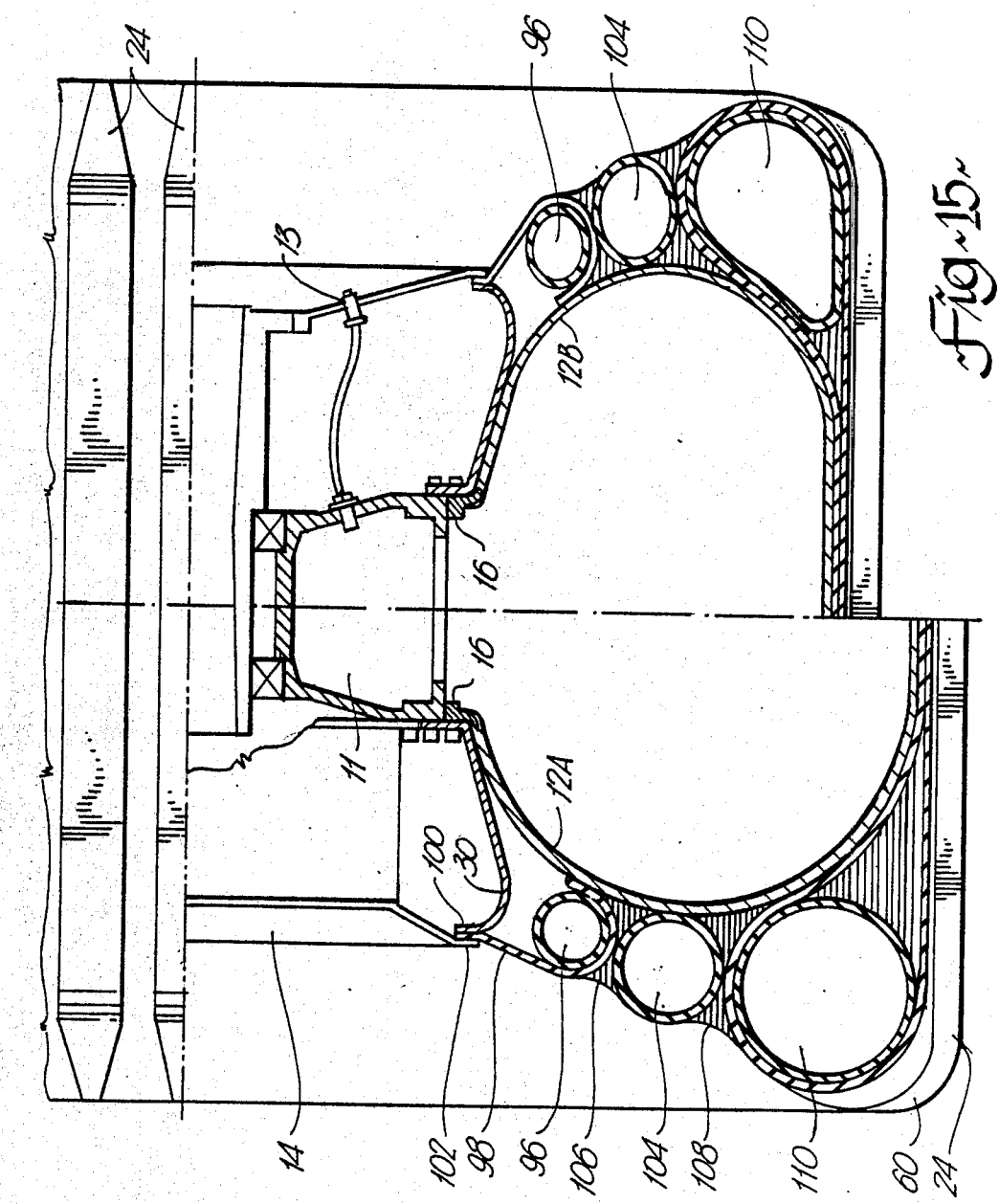

COMPOSITE HIGH MOBILITY TIRE FOR OFF-ROAD VEHICLES

This invention relates to pneumatic tires and in particular to a composite, high mobility tire for off-road vehicles, and to the method of making the tire.

BACKGROUND OF THE INVENTION

In my prior U.S. Pat. No. 4,153,265 issued May 8, 1979 there is disclosed an 8×8 off-road vehicle in the form of a tree harvesting machine. The requirements for tires for a vehicle of this nature cannot be fulfilled in an appropriate way if one turns to the products presently available from tire manufacturers. Tire construction and design concepts presently available would not be satisfactory from the standpoints of performance, reliability and stability. Examples of the presently available tires for off-road vehicle applications are the high-load, rough road tire of radial construction used for earth movers and the like, as well as the terra tire or high floatation off-road conventional constructed tire used on agricultural and recreational type vehicles. These examples of the presently available art would be unsatisfactory in use due to excessive ground contact pressure in the case of earth mover type tires and by insufficient resistance to sidewall damage in the case of terra tires. Both of these types of tires are unsatisfactory from the standpoint of stability due to a lack of torsional and lateral rigidity when operated at the low inflation pressures required for mobility in a machine for tree harvesting operations.

SUMMARY OF THE INVENTION

The tire construction according to the present invention results in a radially reinforced, composite construction, inner torus in combination with an integrated torus support in the form of a tread belt bonded to the torus, the tread belt being provided with a pair of hollow annular chambers on the peripheral side edges of the belt, the chambers being bonded to the periphery of the inner torus. The inner torus incorporates an integrally formed pair of rigid metal flanges rather than a conventional bead construction whereby the tire can be mechanically, detachably secured to a vehicle wheel.

There are numerous advantages to be derived from using a tire constructed in accordance with the present invention on large off-road vehicles such as that described in the abovementioned U.S. Pat. No. 4,153,265 A higher inflation pressure for relatively low ground pressure results in greater tire rigidity with enhanced stability over known tire constructions. The manner in which the belt structure is fabricated and secured to the inner torus ensures that the tire is extremely flexible for operation over stumps, rocks, etc. and for absorbing pressure peaks therefrom. Furthermore, the tire has greater lateral stability during vehicle maneuvering on horizontal ground or on slopes and greater resistance to sidewall buckling under heavy traction load conditions.

Adequate floatation under soft ground operating conditions requires tire deflection rates in the order of 25%. This operation condition necessitates the use of radial reinforcement in the construction of the inner torus and results in greater bulging under load and increased vulnerability of the sidewall of a tire to damage from ground obstacles such as stumps, rocks, etc.

The flexibility of the belt loops permits each such section to fold up under load in a manner that provides for protection to the sidewalls of the torus section. As adequate protection to the undertread area of a tire can be obtained by the steel cord belts of conventional tire construction, this novel approach in the present invention to sidewall protection ensures that all parts of the tire can now have the same level of reliability as that experienced by the undertread portion.

According to one broad aspect, the invention relates to a high mobility tire for off-road vehicles, the tire comprising an inner torus having a pair of rigid flanges integrally formed therewith for mechanically, detachably securing the tire to a base wheel. A tread belt is bonded to the inner torus, the belt including a pair of hollow annular chambers on the peripheral side edges thereof. The belt is substantially wider than the torus with the latter nesting between the hollow annular chambers. A fillet of tough, flexible rubber material is bonded into the area between the inner curvature of the annular chambers and the outer curvature of the torus.

In accordance with a further aspect, the inner torus consists of two half toruses secured together, each torus half comprising layers of rubber having one of the rigid flanges integrally molded therein. An integrally positioned, rubber sheathed steel cable is threaded through apertures in the flange and provides exposed loops which extend beyond the terminal edge of the half torus remote from its associated flange. The cables are evenly tensioned and spaced apart to terminate at a position adjacent to the flange to form a radial reinforcement cord mat. The exposed loops of each half torus are subsequently laced together and the gap between the two half toruses is filled with rubber compound to form a complete inner torus.

The tread belt consists of a plurality of uniform layers of rubber in which a mat of overlaid or loosely woven cylindrical steel cables is incorporated. In addition, a circumferentially wound steel cable is provided on the outside of the plurality of rubber layers and a further rubber layer is provided over the circumferential cable. Tread bars on the belt are positioned transverse to the circumferential cable, the tread bars having steel cables integrally positioned therein.

In a further aspect, one or more annular hoops can be positioned on the outer sidewall of the torus in the area between the annular chamber of the belt and the wheel construction of the vehicle. These hoops can be pressurized or filled with foam rubber and if necessary can be reinforced with wire or steel cord as required by a specific application. These hoops provide increased resistance to sidewall deflection as well as increased protection to the base wheel and sidewall of the inner torus from ground obstacles and debris.

In accordance with a still further aspect, the invention relates to a method of fabricating a tire comprising the steps of laying a uniform layer of any appropriate rubber gum stock over the surface of a half torus mold; positioning a rigid tire flange on supports that locate the tire flange on the inner diameter of the half torus mold and on the surface of the first layer of gum stock; threading a rubber sheathed steel cable through peripheral apertures in the tire flange and looping the cable over retractable pins located on the outer diameter of the half torus mold and retaining the ends evenly tensioned and spaced apart to a position adjacent to the tire flange thereby to form a radial reinforcement cord mat; applying a second uniform layer of appropriate gum stock over the radial reinforcement cord mat; placing a cover mold on the assembly and curing the assembly to produce a half tire section having a rigid tire flange therein on its inner diameter and a frill of uniformly spaced reinforcement cord loops extending beyond the edge of the cured gum stock on the outer diameter thereof.

In accordance with a still further aspect, the invention provides a method of fabricating a tire as described above and further comprising the steps of joining two cured half tire sections by lacing reinforcement cords through alternate loops of those extending from each half section on their outer diameters thereby tying the half sections together mechanically with an appropriate gap between them and which is subsequently filled with green rubber and cured to complete a torus section.

In accordance with an additional aspect, the invention provides a method of fabricating a tire as described above and further comprising the steps of applying at least one flexible hoop of circular cross section on the outer sidewall of the torus intermediate the tread hollow chambers and the vehicle wheel.

BRIEF DESCRIPTION OF THE DRAWINGS

The invention is illustrated by way of example in the accompanying drawings in which:

FIG. 1 is a sectional view through the tire and related wheel construction;

FIG. 2 is a sectional view through the tire-base wheel interface;

FIG. 3 is an elevation view of a segment of the tire flange shown in cross-section in FIG. 2;

FIG. 4 shows the radial cord pattern as laid down in each half torus;

FIG. 5 is a sectional view taken along the lines 5—5 in FIG. 1;

FIG. 5a is a plan view of a mat of reinforcing cable;

FIG. 6 is a further sectional view through the tread of the tire of FIG. 1 and viewed at 90° to the sectional view of FIG. 5 or as seen in the direction of arrow 6—6 in FIG. 5;

FIG. 7 is a sectional view through the half torus mold;

FIG. 8 is an elevation view of a segment of the outer surface of the half torus mold;

FIG. 9 is a perspective view of segments of the half toruses;

FIG. 13 is a perspective view of the tread portion of the tire in its completed form;

FIG. 15 is a cross-sectional view of a tire similar to that shown in FIG. 1 but including a plurality of buffer hoops and sealing skirt on the sidewall of the torus.

Referring to FIG. 1, the tire 10 comprises a torus 12 mechanically connected to a vehicle base wheel 14 by means of a pair of rigid flanges 16 integrally formed with the torus as will be explained relative to FIG. 2. The left hand portion of FIG. 1 shows the torus 12 in its inflated but unloaded condition while the right hand side of FIG. 1 shows the torus deflected under load. A tread belt illustrated generally at 18 is bonded to the torus 12, the belt 18 including a pair of hollow annular chambers 20 on the peripheral side edges of the tire 10, the belt 18 together with the chambers 20 being substantially wider than the torus 12 with the latter nesting between the chambers 20. A fillet 22 of tough, flexible material, preferably rubber, is bonded into the area between the inner curvature of the annular chambers 20 and the outer curvature of the sidewall of the torus 12 to prevent dirt and debris from entering this area. As shown in FIG. 1, the tread belt 18 includes tread or traction bars 24 which extend across the width of the belt and up into the shoulder portion thereof adjacent the chambers 20. The base wheel 14 includes an annular cavity 11 opening into the interior of the torus 12 and which can be used for inflation of the torus by means of an appropriate valve arrangement 13 which could for example be connected to one of the walls of the cavity 11 at one end and to the outer surface of the base wheel at the other end.

Referring now to FIG. 2 as well as to FIG. 1, the rigid flanges 16 (only one of which is illustrated) are secured by bolts 26 of appropriate configuration and strength to the flange 28 of the base wheel 14, flange 28 being a part of the angulated base collar 30 as seen in FIG. 1, the surface of which provides support to the upper sidewall of the torus when the latter is in its deflected position as shown on the right hand side of FIG. 1. Additionally, the collar 30 provides means for mechanically connecting the torus to the base wheel as illustrated. The tapered working surface of collar 30 and opposite annular chamber 20 act as opposing wedge-like members to deform torus 12 under wheel side-loading conditions thus providing increased lateral stiffness characteristics for the tire/wheel assembly.

As seen in FIGS. 2 and 3, the flange 16 has an L-shaped leg 36 conforming to the configuration of the base collar 30 and base wheel 14. An anchoring lip 32 of the flange is embedded in the upper terminal edge 34 of the torus. The L-shaped leg 36 is provided with threaded apertures 38 in individual boss portions 39 for receiving sealing plugs 37 and mounting bolts 26 while the lip 32 is provided with a plurality of equally spaced apertures 40 for anchoring the loops in the individual radial cords. The torus air chamber is sealed on assembly of base collar 30 and torus flange 16 to base wheel 14 by O-ring seal 27.

As shown in FIG. 1, the torus 12 comprises two half toruses 12a and 12b which are assembled prior to bonding to the tread belt. Each torus half, such as the segment of half 12a as shown in FIG. 4, comprises a layer of rubber 44 to which one of the flanges 16 will be integrally molded therein. As seen in FIGS. 3 and 4, rubber sheathed steel cable such as a strand 46 thereof is threaded through the aperture 40 and the lip 32 of the flange 16 and, in the return run, a loop 48 is left exposed to extend beyond the terminal edge 50 of the section of the half torus 12a with the inner terminal end of the cable being retained in a position such as 52 adjacent to the tire flange or at any point appropriate to the strength and continuity of the torus. As shown in FIG. 4, the cables 46 are maintained in uniform, spaced relationship to form a radial reinforcement cord mat 42, the neutral axis of which is the same as in the inflated tire.

Figure 10:
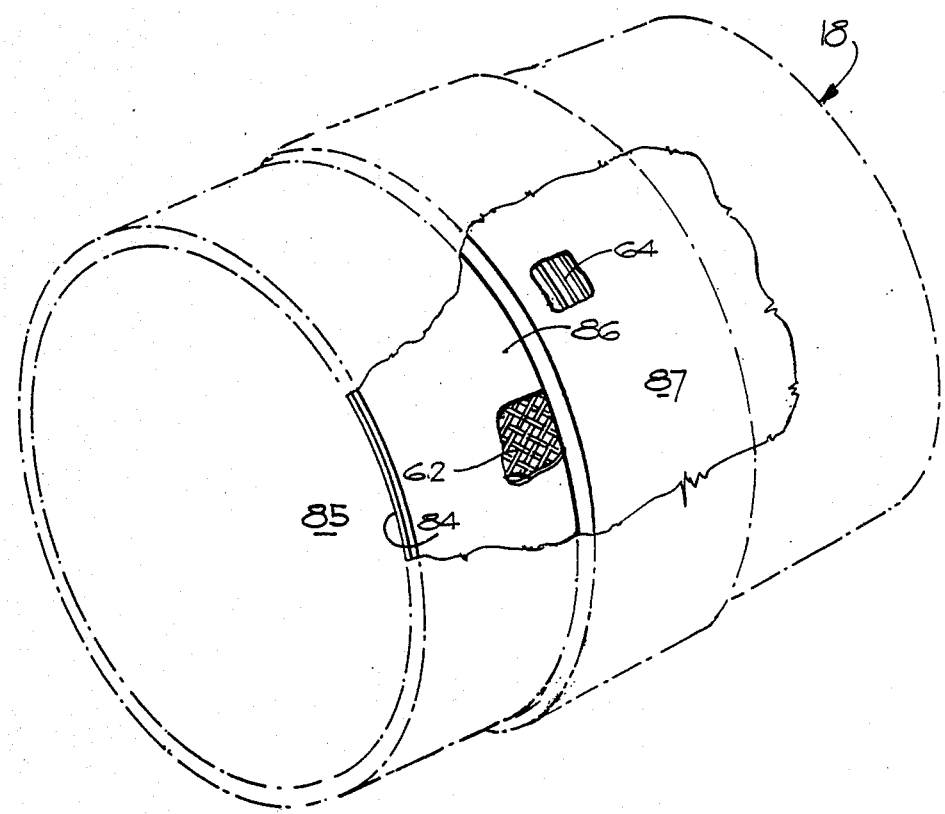
FIG. 10 is a perspective view of the manner of forming the elements making up the tread portion of the tire.

Moving ahead to FIG. 9, the exposed loops 48 on half torus 12a lie between the loops 49 from half torus 12b and one or more lacing cables 54 are threaded between the loops 48 and 49 thereby tying the two half toruses together mechanically with an appropriate gap 56 between the half toruses to permit subsequent sealing and bonding operations.

As shown in FIG. 1, the tread belt 18 has its terminal side edges folded inwardly to form the chambers 20 with the terminal ends 58 of the belt as well as the immediately adjacent portions, being bonded to the juxtaposed portions of the outer wall of the torus 12, the tread bar 24 extending somewhat into the shoulder at 60 as illustrated.

Referring now to the cross-sectional views of FIGS. 5 and 6, the tread area of the tire 10 comprises (a) the layers of rubber constituting the torus 12 with (b) the radial cords 46 therein together with (c) two layers of loosely woven or overlaid belt cords 62 (FIGS. 5a) and (d) a circumferentially and helically wound steel cable 64 positioned adjacent the outer surface of the tire, with (e) a further rubber layer of rubber of appropriate toughness over the top of that outer cable. The tread bars 24 are positioned transverse to the circumferential cable 64, the bars 24 having steel reinforcing cables 66 therein.

It will be appreciated from FIG. 5 that the arrangements of a plurality of layers of steel cables and patterns thereof spaced throughout the thickness of the tread area of the tire 10 provides a high degree of strength, foot-print flexibility and penetration resistance needed for the vehicle mentioned above.

Looking now at the method of making the tire, FIG. 7 illustrates a half torus mold 70 of suitable configuration which serves as a base for mounting thereon a uniform layer 44 of any appropriate rubber gum stock as previously described with respect to FIG. 4. This layer 44 of gum stock constitutes the inner surface of the half torus 12a or 12b shown in FIGS. 1 and 4. One of the rigid tire flanges 16 is detachably secured such as by locking pins or bolts 72 on a support flange 74, pins 72 locating the flange 16 on the inner diameter of the half torus mold 70 with the lip 32 of the flange being located on the surface of the first layer of gum stock 44. The mold 70 is also provided with spring loaded pins 76 on the outer surface of the half torus mold 70, the pins projecting outwardly as shown in FIG. 7 so as to provide anchor means for the looping of the steel cables 46, the outer portion of the pin cooperating with cable guide channels 78 (FIG. 8) to provide a pathway for looping the cable 46 around the body of the pins. As shown in greater detail in the pattern of FIG. 4, the rubber sheathed steel cable 46 is threaded through the peripheral apertures 40 in the tire flange 16 and is looped over the ends of the retractable pins 76, the ends of the cables being evenly tensioned and spaced apart to positions such as 52 and 80 in FIG. 4 adjacent to the tire flange 16 to form the radial reinforcement cord mat.

As seen in FIG. 7, the second layer of appropriate gum rubber stock 82 is then placed over the radial reinforcement cord mat 42, a cover mold (not shown) is then placed on the assembly and the torus assembly is cured to produce a half tire section such as the half torus 12a of FIG. 1 which has the rigid flange 16 integrated therein on its inner diameter. As previously described and as shown in FIG. 9, the half tire section has a frill of uniformly spaced reinforcement cord loops 48 which extend beyond the cured gum stock on its outer diameter 50. Two cured half tire sections 12a and 12b are assembled and placed so that the loops 48 from half torus 12a mesh with the loops 49 from half torus 12b and these loops are laced together by reinforcement cords 54 to tie the half sections together leaving a gap 56 between them to permit subsequent filling and sealing operations. This completes the formation of the torus 12 shown in FIG. 1.

The tread belt 18 is then formed as a sleeve as shown in FIG. 10 by positioning a first uniform layer of gum stock 84 on a cylindrical drum 85 of appropriate diameter and length and then applying the steel mat 62 of either loosely woven or layered construction on the first layer of gum stock. Subsequently, a second uniform layer of gum stock 86 is placed on the cylindrical drum over the steel mat 62 and to completely cover the same to form a thin flexible steel based sleeve. Over the central portion of the sleeve that will subsequently become the undertread section of belt 18 (FIG. 6) a rubber sheathed steel cable 64 is wound circumferentially and helically around the sleeve in uniformly spaced rows across the surface of the undertread area as shown in FIG. 10, the cable layer being suitably anchored to the sleeve at each end and a final layer of rubber 87 is applied thereover.

Figure 11:
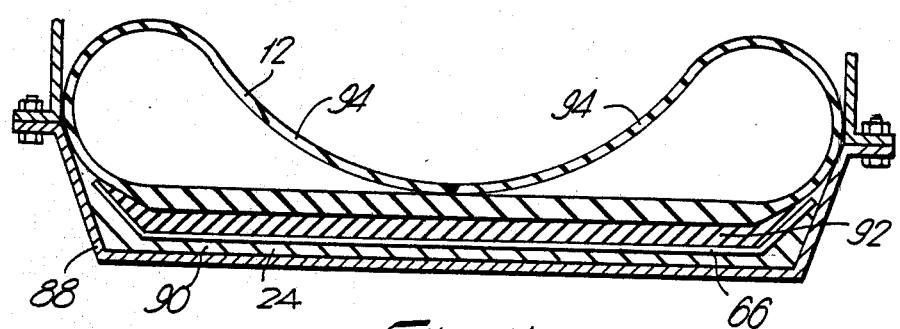
FIG. 11 is a cross-sectional view of the tread portion of the tire showing the method of applying the tread bars thereto.
Figure 12:
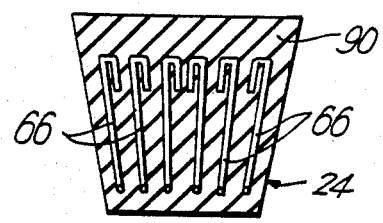
FIG. 12 is an end view of the tread bar being applied to the tread in FIG. 11 and illustrating the positions of the reinforcing cables therein.
Figure 14:
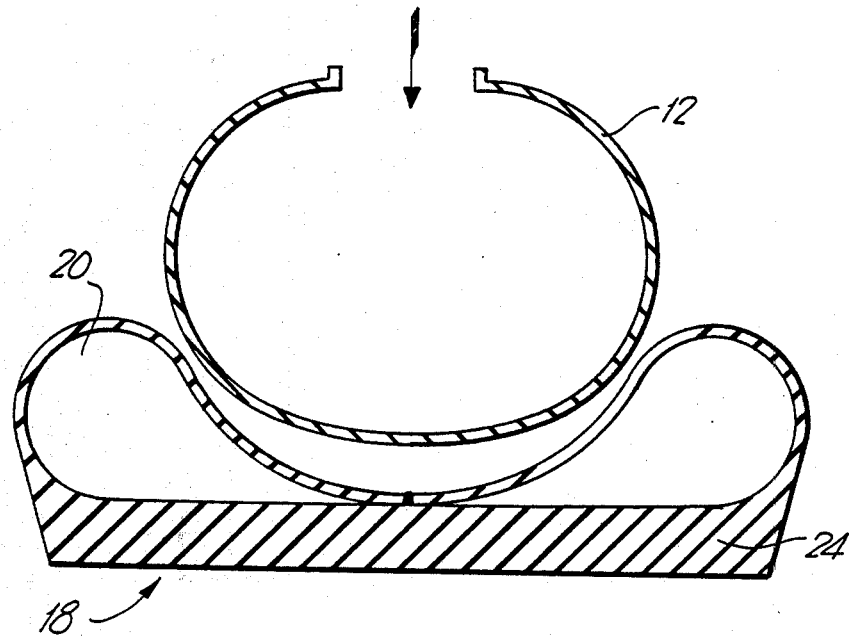
FIG. 14 is a cross-sectional view showing the placement of the formed inner torus into engagement with the tread belt.

Turning to FIG. 11, the tread bars 24 are then made up in a steel mold 88 by means of a preformed first layer of gum stock 90 over which a series of spaced steel cables 66 (FIG. 5) are laid and which extend partially up the sides of the mold segment 88 in a pattern shown in FIG. 12. A further layer 92 of preformed gum stock is laid over the cables 66, the mold segments 88 are then locked up to bond the tread bar 24 to the tread belt 18, the terminal ends 94 of the belt being folded inwardly and bonded to the position shown in FIG. 11 to complete the belt structure as illustrated in FIG. 13. The formed central torus 12 made up of the half toruses 12a and 12b laced together, is then placed into central position on the tread belt as shown in FIG. 14 between the free terminal portions of the sleeve which are then bonded to the outer surface of the torus. The preformed fillet 22 (FIG. 1) of tough flexible rubber material is subsequently bonded into the area between the curvature of the now formed peripheral chambers 20 and the outer surface of the torus to seal the portion therebetween.

As shown in FIG. 15, the reliability characteristics of the tire may be further increased by adding protection to the exposed sidewall of the torus 12 through the addition of one or more circumferential tubular hoops 96. Preferably, a first hoop 96 would be resiliently secured by means of a flexible skirt 98 having its upper terminal edge attached to the vehicle wheel between the outer terminal end 100 of the collar 30 and a lip 102 of the collar cover-plate. Skirt 98 encircles the hoop 96 and would be bonded at its inner end to the adjacent surface of the torus 12. A series of additional hoops could be provided on the exposed sidewall of the torus 12 between the collar 30 and the belt chamber 20 as shown in FIG. 15 and these additional hoops such as 104 could be bonded to the adjacent surfaces by means of fillets 106 and 108. If necessary, chamber 20 could incorporate one or more hoops such as 110.

As described above, the tire of the present invention comprises three subassemblies bonded together to form a composite construction tire having unusual and novel undertread and sidewall characteristics. The tire so formed is intended to be mounted on a base wheel support assembly for large off-road vehicles. It would be in excess of 4 feet in width and is intended to operate at a torus inflation pressure of approximately 16 lbs. per square inch but with half that ground-contact pressure as a consequence of its ability to spread wheel loads from the torus through its flexible belt to ground. This is achieved by the circumferential flexibility of the torus-belt construction combined with appropriate lateral stiffness in the belt as a result of the beam effect created by its tread bars.

The present invention has been described in connection with a specific embodiment of the tire and in relation to a specific use. However, those skilled in the art will appreciate that a variety of designs are possible for the tire mounting structure keeping in mind the essential requirement which is a means of mechanically locking the tire beads between the wheel proper and the tire supporting structure. For example, while the location of the beads or tire flanges are shown near the center of the assembly, they may be located anywhere out to the point of support of the undeflected tire. Furthermore, they may be oriented as shown or moved into the plane of the torus.

The terms and expressions which have been employed in this disclosure are used as terms of description and not of limitation and there is no intention in the use of such terms and expressions to exclude any equivalents of the features shown and described or portions thereof but it is recognized that various modifications are possible within the scope of the invention claimed.

I claim:

1. A high mobility tire for off-road vehicles, said tire comprising an inner torus having a pair of rigid flanges integrally formed on the inner periphery thereof for detachably securing the tire to a vehicle wheel; and an annular flexible tread belt bonded to the outer periphery of the inner torus, the tread belt comprising an annulus having both lateral extremities folded inwardly to lie adjacent to the internal surface of the annulus and bonded between the inner torus and said internal surface, thereby defining a pair of hollow annular chambers on the peripheral side edges thereof, the belt being substantially wider than the inner torus with the latter nesting between said annular chambers.

2. A tire according to claim 1 including a fillet of tough, flexible rubber material bonded into the area between the curvature of the belt portion defining the annular chambers and the curvature of the outer wall of the inner torus.

3. A tire according to claim 1 wherein the inner torus comprises two half toruses secured together, each torus half comprising layers of rubber having one of said flanges integrally molded therewith; and integrally positioned rubber sheathed steel cable threaded through apertures in the flange and providing exposed loops extending beyond the edge of said torus remote from the flange, said cables being evenly tensioned and spaced apart to terminate at a position adjacent to the flange to form a radial reinforcement cord mat, the exposed loops of each half torus being laced together to form the inner torus; the neutral axis of the torus when inflated being the same as the neutral axis of the half torus as formed.

4. A tire according to claim 1 wherein the central portion of the tread belt comprises a plurality of uniform layers of rubber having a mat of reinforcing cables therebetween; a non-extendable, helically wound layer of steel cable on the outside of the plurality of rubber layers and a further rubber layer over the helically wound layer of cable; and tread bars on the belt positioned transverse to the helically wound cables and outer layer of rubber, said tread bars having steel cables integrally positioned therein.

5. A high mobility tire for off-road vehicles, said tire comprising:
    (a) an inner torus having means on its inner periphery for detachably securing the tire to a vehicle wheel;
    (b) a flexible tread belt bonded to the external periphery of the inner torus and having both lateral extremities folded inwardly and bonded between the central portion of the tread belt and the inner torus to define a pair of hollow annular chambers on the peripheral side edges thereof, said belt being substantially wider than said torus with the torus nesting between said annular chambers;
    (c) at least one hollow hoop member bonded to the outer surface of the torus intermediate each annular chamber of the tread belt and that portion of the torus that engages the wheel of the vehicle to which it is attached; and
    (d) fillets of tough flexible rubber material bonded into the areas between the curvatures of the torus and the external surfaces of the adjacent annular chamber and hoop members.

6. A high mobility tire according to claim 5 in which a purality of hoops are bonded to the exposed sidewall of the torus and a flexible skirt member supporting the uppermost hoop and being bonded at its lower end to the uppermost hoop and the exterior of the torus and, at its other end, being adapted to be detachably secured to the wheel structure of the vehicle.

7. A high mobility tire for off-road vehicles, said tire comprising an inner torus having means on its inner periphery for detachably securing the tire to a vehicle wheel; and a flexible tread belt bonded to the external peripheral surface of the inner torus, the tread belt comprising a torus having the central wall portions thereof collapsed and bonded together to define a pair of hollow annular chambers on each side of a solid central portion, the tread belt being substantially wider than the inner torus with the latter nesting between said annular chambers and bonded to said solid central portion.

8. A tire according to claim 7 including a fillet of tough, flexible rubber material bonded into the area between the wall of each annular chamber and the adjacent wall of the inner torus.

9. A tire according to claim 7 wherein the inner torus comprises two half toruses secured together, each torus half comprising layers of rubber; a reinforcing cable disposed between said rubber layers in a successive loop configuration extending from the inner peripheral edge of the half torus to the outer peripheral edge thereof and providing exposed loops extending beyond the outer edge of said half torus, thereby forming a radial reinforcement cord mat, and means for securing the exposed loops of each half torus together by a reinforcing material of high tensile strength to form the inner torus.

10. A tire according to claim 7 wherein the tread belt torus is originally formed as an annulus comprising a plurality of uniform layers of rubber having a mat of reinforcing cables therebetween; a non-extendable, helically wound layer of steel cable on the outside of the plurality of rubber layers and a further rubber layer over the helically wound cable, all of said layers being bonded together.

11. A tire according to claim 7 wherein the tread belt torus is originally formed as an annulus comprising a plurality of uniform layers of rubber having a mat of reinforcing cables therebetween; a non-extendable, helically wound layer of steel cable on the outside of the plurality of rubber layers and a further layer of rubber over the helically wound cable, all of said layers being bonded together, and tread bars bonded to the belt in a position transverse to the helically wound cables, said tread bars having steel cables integrally positioned therein.

12. A high mobility tire according to claim 1 plus a pair of rigid annular collars respectively secured to the rigid flanges and projecting outwardly and downwardly therefrom to limit load produced upward deflection of the sidewalls of said inner torus.

* * * * *